US011194682B2

(12) United States Patent
Vokaliga et al.

(10) Patent No.: US 11,194,682 B2
(45) Date of Patent: Dec. 7, 2021

(54) CONNECTIVITY-AWARE WITNESS FOR ACTIVE-ACTIVE STORAGE

(71) Applicant: EMC IP Holding Company LLC, Hopkinton, MA (US)

(72) Inventors: Deepak Vokaliga, Hopkinton, MA (US); Svetlana Sokolova, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 16/601,690

(22) Filed: Oct. 15, 2019

(65) Prior Publication Data

US 2021/0109827 A1 Apr. 15, 2021

(51) Int. Cl.
*G06F 11/20* (2006.01)
*G06F 11/14* (2006.01)

(52) U.S. Cl.
CPC ...... *G06F 11/2069* (2013.01); *G06F 11/1425* (2013.01); *G06F 2201/805* (2013.01); *G06F 2201/82* (2013.01)

(58) Field of Classification Search
CPC ............. G06F 11/0709; G06F 11/1425; G06F 11/202; G06F 11/2028; G06F 11/2056; G06F 11/2069
See application file for complete search history.

(56) References Cited

U.S. PATENT DOCUMENTS

| | | | | |
|---|---|---|---|---|
| 8,578,204 | B1* | 11/2013 | Ortenberg | ........... G06F 11/1425 714/4.11 |
| 10,127,124 | B1* | 11/2018 | Dash | ..................... G06F 11/004 |
| 2014/0169214 | A1* | 6/2014 | Nakajima | ........... H04L 67/1097 370/254 |
| 2016/0364287 | A1* | 12/2016 | Johri | ...................... G06F 3/0683 |
| 2017/0364419 | A1* | 12/2017 | Lo | ........................ G06F 11/0757 |
| 2018/0268011 | A1* | 9/2018 | Cao | ..................... G06F 16/2343 |
| 2020/0250055 | A1* | 8/2020 | Zhang | ................. G06F 11/1645 |

* cited by examiner

*Primary Examiner* — Bryce P Bonzo
*Assistant Examiner* — Albert Li
(74) *Attorney, Agent, or Firm* — Amin, Turocy & Watson, LLP

(57) ABSTRACT

Architectures and techniques are described that can enhance the functionality of a witness for an active-active storage array. In the event of a dual storage area network (SAN) failure, or another suitable event, host-array connectivity can take precedence for the witness in determining a winner or loser. Techniques are presented to identify connectivity issues and to utilize connectivity data in connection with determining a winner or a loser.

20 Claims, 10 Drawing Sheets

CONNECTIVITY-AWARE WITNESS FOR ACTIVE-ACTIVE STORAGE

TECHNICAL FIELD

The present application relates generally to the field of data storage and, more particularly, to improving witness designations in the event of a failure condition of an active-active storage array.

BACKGROUND

In current storage networks, and particularly storage networks including geographically remote directors (e.g., nodes) and storage resources, preserving or reducing bandwidth between resources and directors while providing optimized data availability and access is highly desirable. Data access may be localized, in part, to improve access speed to pages requested by host devices. Caching pages at directors provides localization; however, it is desirable that the cached data be kept coherent with respect to modifications at other nodes that may be caching the same data.

Data transfer among storage devices, including transfers for data replication or mirroring functions, may involve various data synchronization processing and techniques to provide reliable protection copies of data among a source site and a destination site.

In an active-active storage system, if there are multiple host interfaces to a storage device, each of the interfaces may provide equal access to the storage device. With active-active storage access, hosts in different locations may have simultaneous read/write access via respective interfaces to the same storage device and/or the same data. Various failures in an active-active system may adversely impact synchronization and hinder the ability of the system to recover.

For example, in an active-active data storage environment, a witness can be implemented to resolve split-brain situations (also referred to as network partition situations). A split-brain situation can occur when communication between various storage nodes is lost. As a result, each storage node may process IO transactions independently because an IO transaction performed by one node is not updated or synchronized with the other node due to the loss of communication. As a result, data at each node can reflect different states (e.g., split-brain) and/or coherency can be lost. In this type of situation, the witness acts as a mediator by designating one of the storage nodes as a winner and making the other a loser. The winning storage node continues to be available, while the losing storage node suspends its availability for input and output (JO) requests, thereby mitigating the potential split-brain situation.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
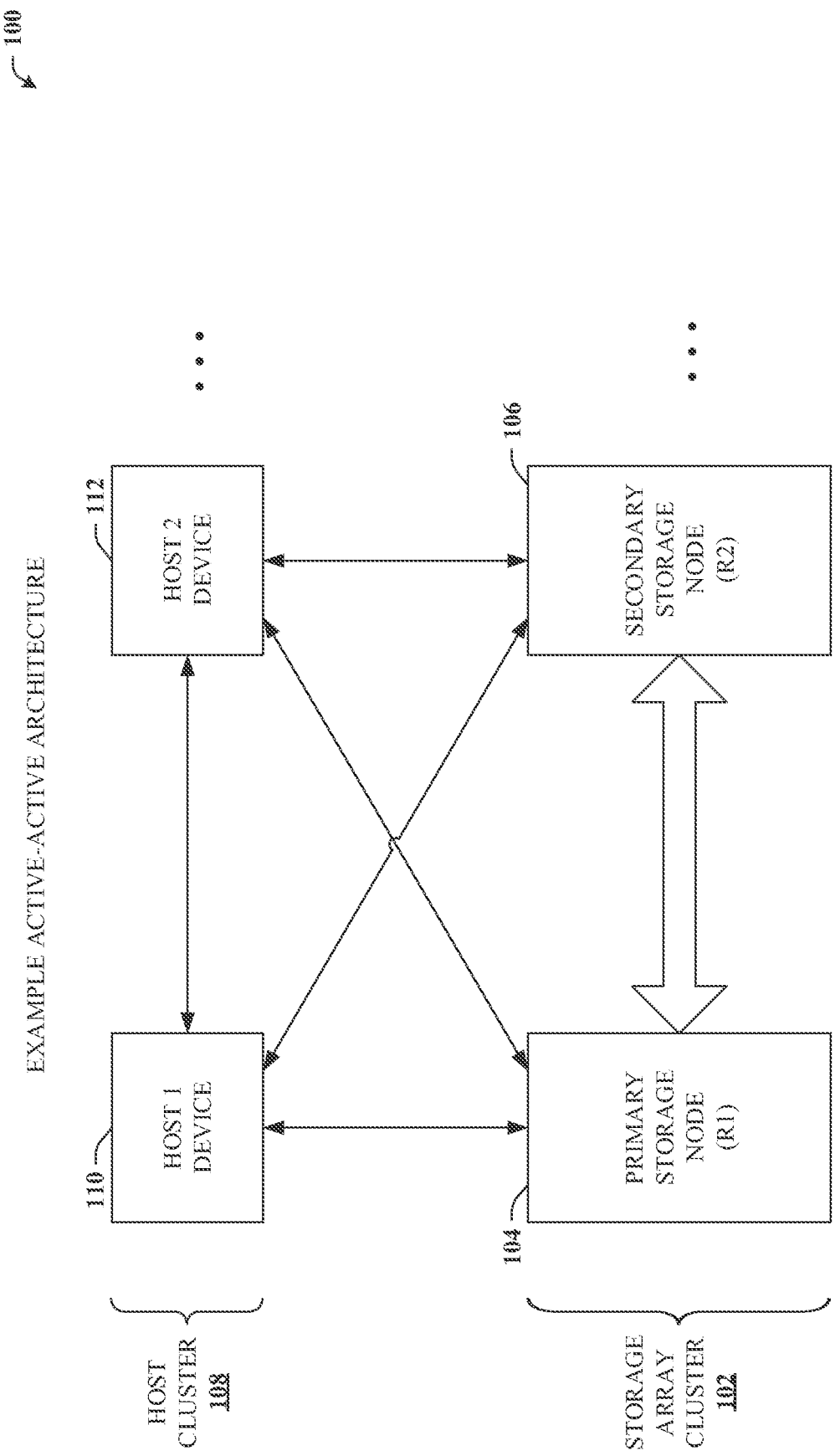
FIG. 1 illustrates a block diagram of an example system comprising a storage array that can provide data storage services and can be configured according to an active-active architecture or paradigm in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of a system 100 System 100 can represent a storage array that can provide data storage services and can be configured according to an active-active architecture or paradigm in accordance with certain embodiments of this disclosure. System 100 can comprise a storage array cluster 102 where data can be physically stored. Storage array cluster 102 can comprise multiple storage nodes, such as primary storage node 104 (R1) and secondary storage node 106 (R2). Each node of storage array cluster 102 can maintain a complete copy of the data, which can be synchronized in response to changes occurring during an active session at any node. In some embodiments, the nodes of storage array cluster 102 (e.g., primary storage node 104, secondary storage node 106 . . . ) can represent individual data centers that can be geographically remote from one another.

System 100 can further comprise host cluster 108, which can comprise multiple host devices such as host device 110, host device 112, and so forth. Host cluster 108 can represent a group of interfaces by which JO transactions are received and provided to storage array cluster 102. As with the individual storage nodes, the individual hosts of host cluster 108 can be geographically remote from one another. For example, host device 110 can represent a local interface to primary storage node 104 at one location, while host device 112 can represent a local interface to secondary storage node 106 at a different location. Both locations can be active to receive JO transactions, hence an active-active architecture. An active-active architecture is one in which there is a network of independent storage nodes, each having access to common, replicated data, enabling all storage nodes to participate in common applications or services.

Figure 2:
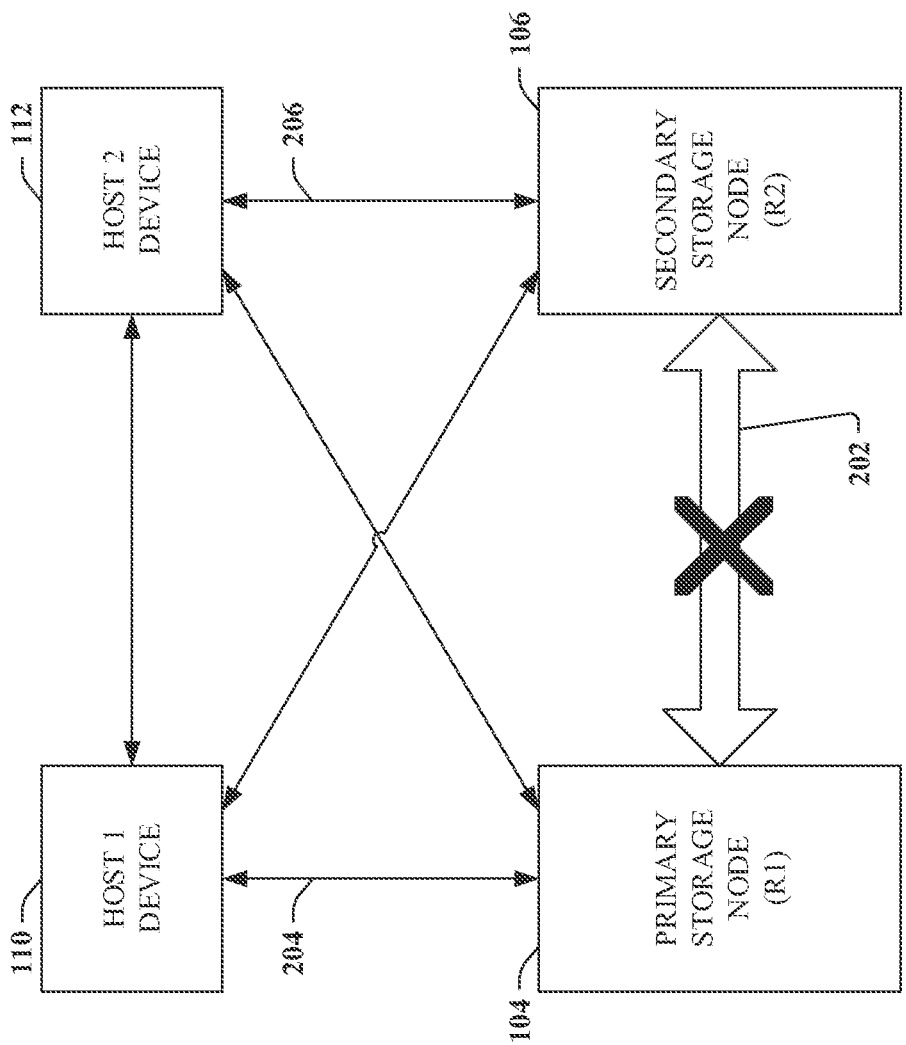
FIG. 2 depicts a block diagram of an example system suffering a loss of communication between storage nodes, which can result in a split-brain issue in accordance with certain embodiments of this disclosure.

FIG. 2 illustrates a block diagram of system 200 depicting a loss of communication between storage nodes, which can result in a split-brain issue in accordance with certain embodiments of this disclosure. As depicted, communication (e.g., communication path 202) between primary storage node 104 and secondary storage node 106 is lost, for example due to a storage area network (SAN) failure. However, primary storage node 104 and secondary storage node 106 are still up and running and can respond to active session IO transactions that will typically arrive from respective local host devices 110, 112. For instance, host device 110 can communicate with either node, but will typically communicate with primary storage node 104 during an active session via communication path 204 because such can provide better response times. Likewise, host device 112 can communicate with either node, but will typically communicate with secondary storage node 104 via communication path 206 for the same reasons.

However, because communication path 202 has been lost, updates to primary storage node 104 cannot be forwarded to second storage node 106 and vice versa. As a result, updates due to IO transactions of one active session can cause the state of data at primary storage node 104 to evolve differently than the state of data at second storage node 106, which is instead being updated according to a different active session. Since communication path 202 is down, there is no ability to resolve these differences and the split-brain situation arises. One mechanism for dealing with split-brain situations is to introduce what is referred to herein as a witness, as further detailed in connection with FIG. 3.

Figure 3:
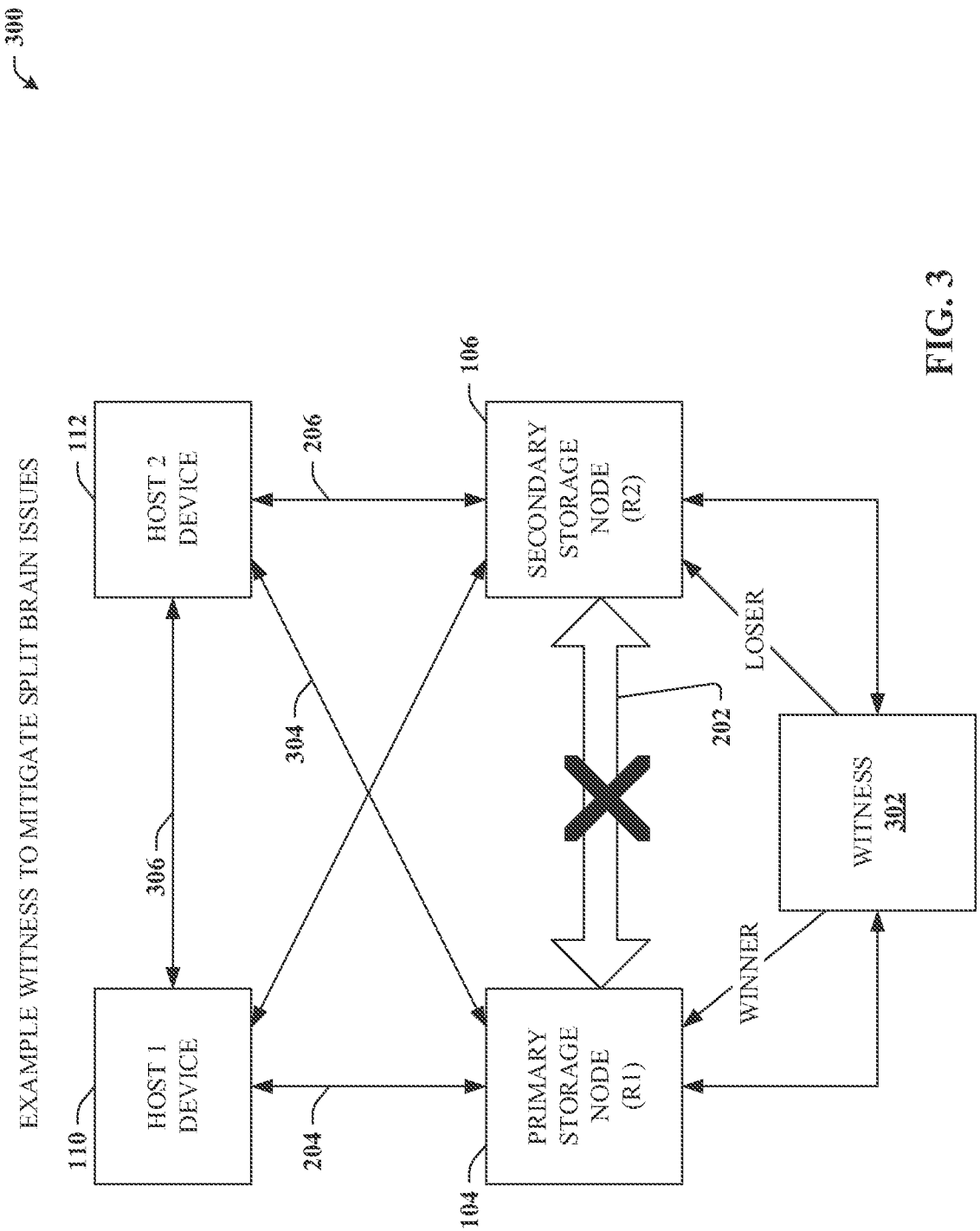
FIG. 3 depicts a block diagram of an example system implementing a witness in order to mitigate split-brain issues in accordance with certain embodiments of this disclosure.

FIG. 3 illustrates a block diagram of system 300 implementing a witness in order to mitigate split-brain issues in accordance with certain embodiments of this disclosure. For example, witness 302 can be deployed in active-active storage setups. Witness 302 can act as a mediator of sorts to rapidly, upon failure of communication path 202, declare winners and losers between the various storage nodes of storage array cluster 102. Generally, a storage node designated as a winner (e.g., primary storage node 104) can continue to be available, whereas storage nodes designated as a loser (e.g., secondary storage node 106) can be instructed to immediately suspend availability.

By suspending availability of secondary storage node 106, host device 112 no longer communicates with storage array cluster 102 via communication path 206, but rather via communication path 304 or via failover path 306. As a result, both host device 110 and host device 112 communicate IO transactions with primary storage node 104, averting a split-brain situation, e.g., by ensuring only certain nodes are available for IO transactions.

Witness 302 can rely on a variety of criteria for determining winners and losers. For example, individual storage nodes can have different configurations and/or state characteristics, which can be taken into consideration at the time of failure of communication path 202. Other factors can relate to the presence of another synchronous or asynchronous data replication leg on a node, faulted hardware, bias vs. non-bias role and numerous other environmental factors.

In other words, an environmental-aware witness 302 can effectively select the best storage node for the situation and designate that storage node as the winner. However, additional issues can arise.

Figure 4:
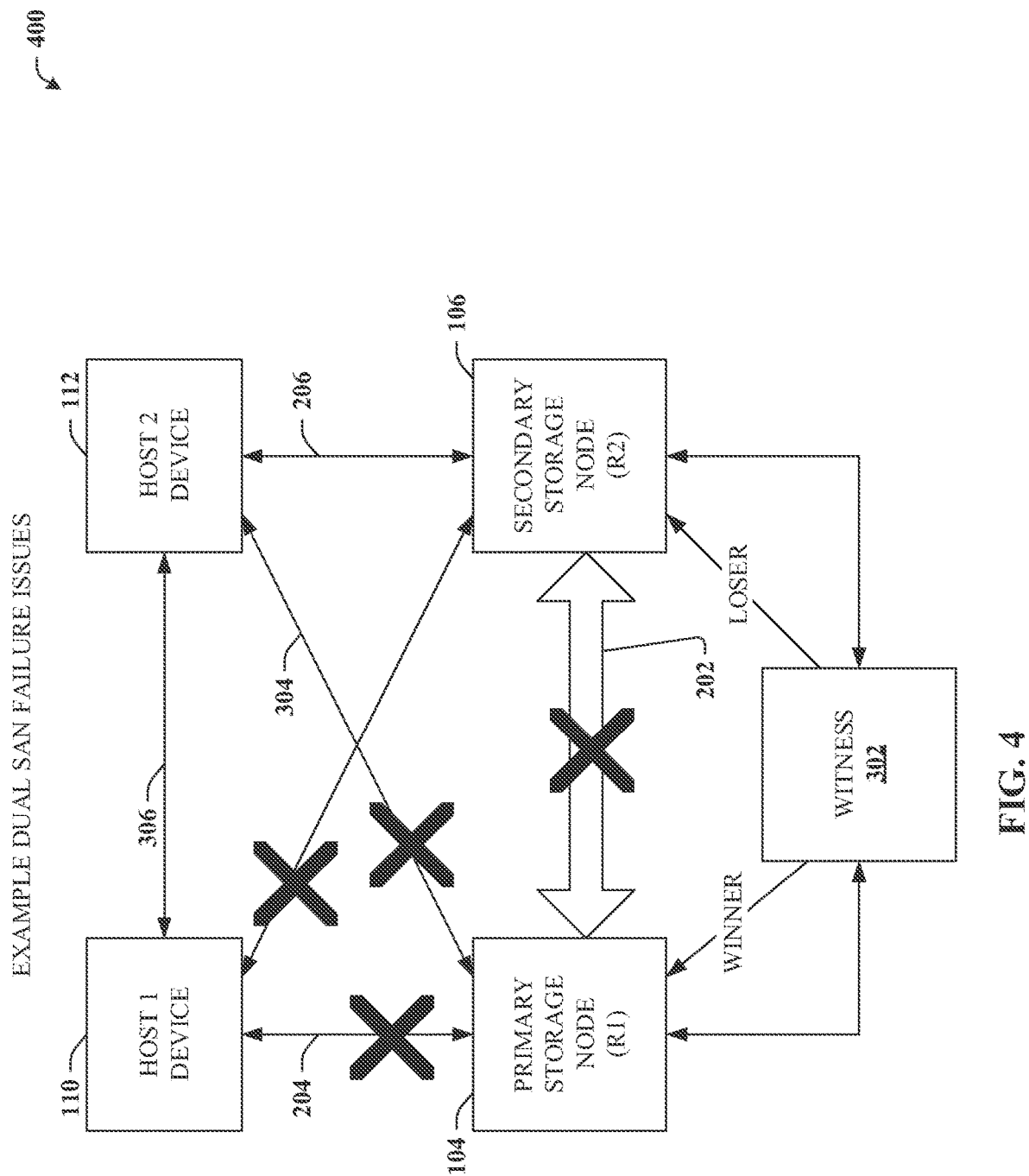
FIG. 4 illustrates a block diagram of an example system implementing a witness during a dual SAN failure in accordance with certain embodiments of this disclosure.

FIG. 4 illustrates a block diagram of system 400 implementing a witness during a dual SAN failure in accordance with certain embodiments of this disclosure. A dual SAN failure can arise when communication between storage nodes (e.g., communication path 202) is lost and, concurrently, communication between the storage array cluster 102 and a host (e.g., communication paths 204, 304 . . . ) is lost. As an example, a dual SAN failure might arise when network adapters for communications path 202, 204, 304 and potentially others share a common power source. If that power source is interrupted, that portion of the SAN can go down, even while primary storage node 104 continues to operate.

In the case of a dual SAN failure, witness 302 sees R1 and R2 are active, but communication path 202 has failed, giving rise to a potential split-brain situation. Based on various environmental factors, witness 302 can determine that primary storage node 104 (R1) is the best node for the current situation, and thus designate R1 as the winner, meaning R2 is a loser and operation is suspended. Unfortunately, host cluster 108 does not have access to either storage node. R1 is unavailable due to the SAN failure, and R2 is unavailable due to being designated the loser, in which operation is suspended. As one result, hosts of host cluster 108 can crash.

The disclosed subject matter, in some embodiments, can mitigate these and other issues. For example, the disclosed subject matter can mitigate issues that arise in connection with a dual SAN failure, and other suitable situations. Such can be resolved or mitigated by implementing enhanced techniques in connection with environmental-aware witness 302. For example, witness 302 can be improved or enhanced by further considering states of communication paths (e.g., host-array connectivity) between host cluster 108 (e.g., host device 110, 112 . . . ) and storage array cluster 102 (e.g., primary storage node 104, secondary storage node 106 . . . ).

As one example, the presence of optical lights at network adapter ports can be a measure of this connectivity. In some embodiments, the states of those optical links can be continuously monitored and accounted by decision-making procedures performed by a given witness. While the witness can still operate according to environmental-aware criteria, the connectivity aspect can be assigned a highest priority by the witness. For example, this newly introduced connectivity criterion can override witness 302 selection of R1 as a winner and instead designate R1 as a loser and R2 as a winner due to the connectivity criterion. As can be seen, in that case, operation of R2 would not be suspended so host cluster 108 will still have viable communication paths to storage array cluster 102, e.g., via failover path 306 and communication path 206.

In some embodiments, the host-array connectivity can be continuously monitored by, for instance, examining the states of optical links on appropriate network adapters and mapping volumes of the storage nodes to physical ports of the network adapter. In some embodiments, a dynamic host-connectivity bitmap is maintained internally where each bit indicates a host-array connectivity state of an individual active-active session. Each session can be handled independently from other sessions and may have different host adapter port mappings from others. A session can be identified as one with no host-array connectivity when all host-adapter ports mapped occupied by this session loose optical light. Depending on the host adapter port states and mappings to the active-active sessions, some sessions might be declared as ones with host-array connectivity loss while others may continue normal operation, accepting host IO transactions.

When a dual SAN disaster occurs, resulting in loss of host-array connectivity, the enhanced environmental-aware witness might determine that R1 is a preferred winner, but might only give winning priority to the node (e.g., R1) with active host-array connectivity presence. This decision to declare the node which lost host-array connectivity as a non-preferred winner (e.g., a loser due to the connectivity aspect) can be made locally right after the failure of communication path 202 without need to inform the other node(s). That is, R2 need not be informed that R1 has been suspended, but rather can just continue operation.

Example Systems

Figure 5:
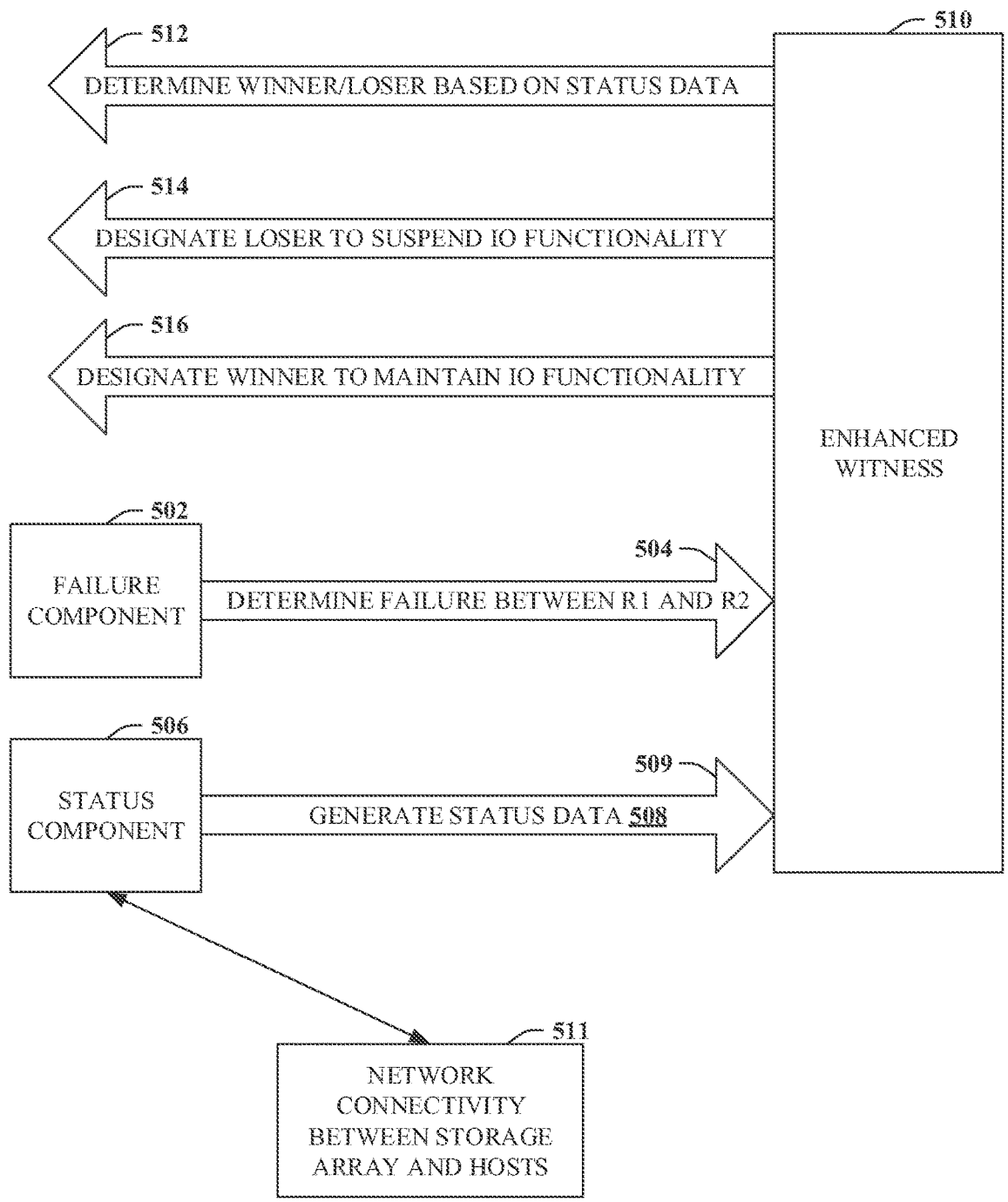
FIG. 5 a block diagram of an example system including an enhanced witness that can determine a loser or a winner as a function of network connectivity between the host and the array in accordance with certain embodiments of this disclosure.

Referring now to FIG. 5, a block diagram of an example system 500. System 500 can include an enhanced witness that can determine a loser or winner as a function of network connectivity between the host and the array in accordance with certain embodiments of this disclosure. Generally, witness 510 (and other systems, components, or devices detailed herein) can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 5 and other figures disclosed herein.

System 500 can include failure component 502 that can determine (e.g., determination 504) a failure of communication between storage nodes of a storage array comprising primary storage node 104 and secondary storage node 106. For example, failure component 502 can determine a failure of communication path 202. As a result, the storage nodes might be unable to synchronize and it can be determined that a split-brain situation can occur, which can cause the coherency of user data to become compromised, as well as other potential issues.

System 500 can further include status component 506. Status component 506 can generate status data 508, which is illustrated at reference numeral 509. Status data 508 can be representative of one or more statuses of network connectivity 511 between the storage array (e.g., devices of storage array cluster 102) and one or more host devices (e.g., devices of host cluster 108) that communicate with the storage array, such as to communicate IO transactions. It is appreciated that status data 508 can thus be employed to identify certain situations, such as a dual SAN failure.

System 500 can include enhanced witness 510. In response to the failure of communication (e.g., determined by failure component 502), enhanced witness 510 can perform an enhanced selection procedure that can be determined to select a winner or a loser in certain situations, such as in the event of a dual SAN failure. During this enhanced selection procedure, enhanced witness component 510 can determine (e.g., determination 512), as a function of status data 508, a loser (or a winner) from among the storage nodes. In other words, a loser (or winner) can be determined based on information relating to network connectivity 511, which is further detailed in connection with FIG. 6. At reference numeral 514, the loser can be designated to suspend IO functionality, while at reference numeral 516, the winner can optionally be designated to continue or maintain IO functionality. Based on these designations, the indicated loser can be issued instructions to suspend IO functionality.

It is appreciated that failure component 502 and status component 506 are illustrated as separate components to aid in a conceptual understanding of the disclosed subject matter. In some embodiments, all or portions of failure component 502 and status component 506 can be included in enhanced witness 510. Further, in some embodiments, enhanced witness 510 can have additional environmental-aware functionality or other functionality that can be used to choose a winner or a loser according to other factors in other situations. However, when a dual SAN failure event, or another suitable event, is detected, status data 508 can be attributed the highest priority or weight when selecting a loser or winner.

Figure 6:
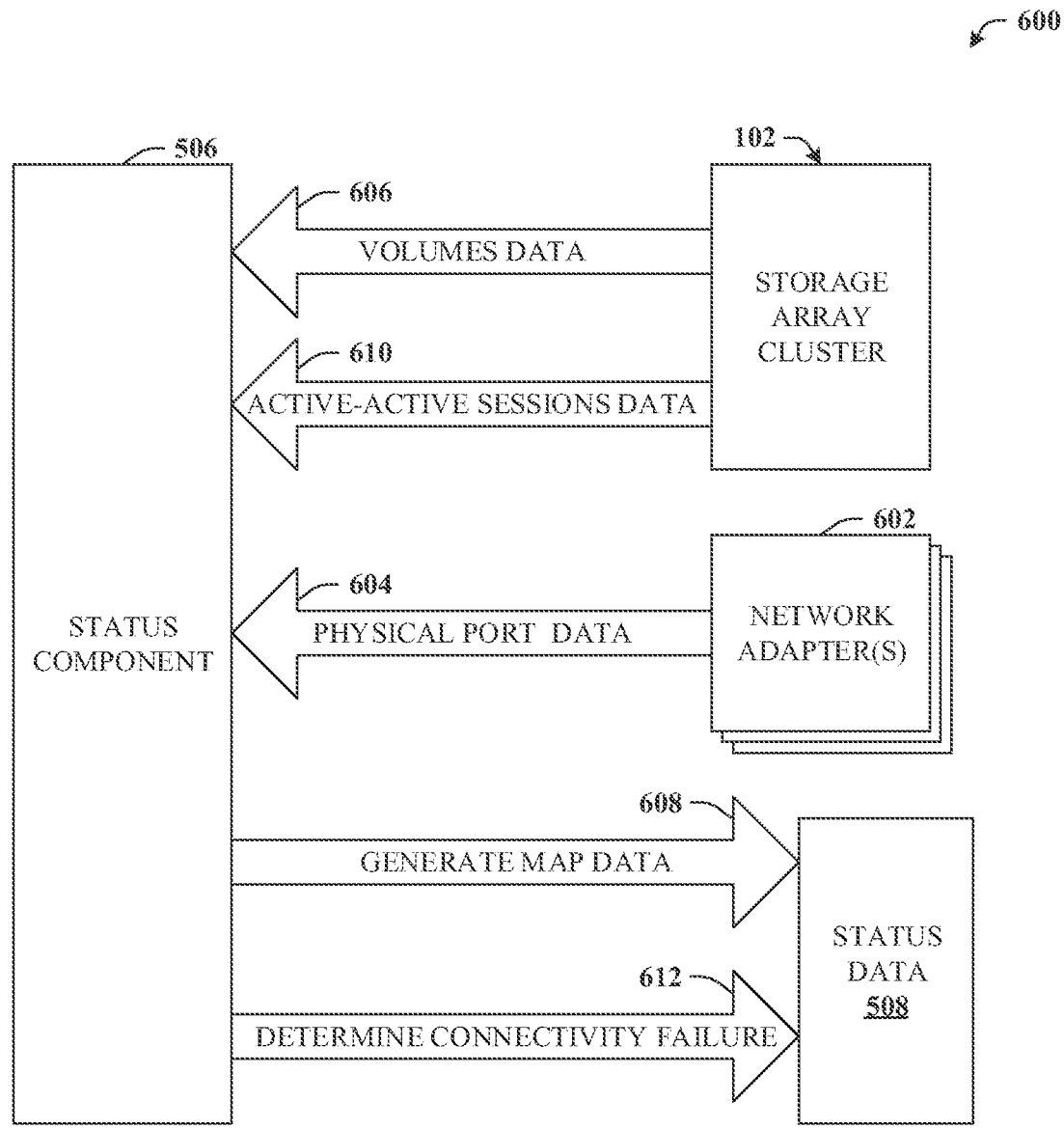
FIG. 6 depicts an example diagram that illustrates additional aspects or elements of the status component in accordance with certain embodiments of this disclosure.

With reference now to FIG. 6, block diagram 600 is depicted. Diagram 600 illustrates additional aspects or elements of status component 506 in accordance with certain embodiments of this disclosure. As previously explained, status component 506 can generate status data 508. As one example, status data 508 can be generated in response to monitoring one or more network adapters that convey data between host devices and storage nodes. For example, a connectivity state that drives a port light indicator can be used as network connectivity 511 as well, in order to generate status data 508.

In some embodiments, status component 506 can receive physical port data as illustrated at reference numeral 604. Physical port data can reflect the connectivity state for physical ports of network adapters 602. Such can be represented as a binary bit where values of '0' or '1' can distinguish between a connected state versus no connection. Status component 506 can further receive volumes data 606 from storage array cluster 102, where each of the storage nodes (e.g., primary storage node 104, secondary storage node 106 . . . ) can provide information indicative of storage volumes.

Based on port data 604 and volumes data 606, status component 506 can generate map data, as illustrated at reference numeral 608. Map data can be indicative of a mapping of volumes of the storage array to physical ports of network adapters 602. This map data can be continuously updated, e.g., to reflect losses of connectivity between the host and the array.

As has been previously noted, the storage array can be an active-active architecture, where many active (or active-active) sessions can be operated concurrently. In some embodiments, status component 506 can receive active-active session data from storage array cluster 102, which is illustrated at reference numeral 610. This active-active session data can be indicative of all or a portion of the active-active sessions being serviced by storage array cluster at a given time. Thus, map data can be generated and/or maintained on a per active-active session basis. For example, map data can comprise first session data indicative of a first mapping of a first active-active session and second session data indicative of a second mapping of a second active-active session, and so on.

Based on the map data, which can be included in status data 508, status component 506 can be used (e.g., by enhanced witness component 510) to determine the loser (or winner) in certain circumstances, such as during a dual SAN failure event. For example, status component can determine a connectivity failure, as illustrated at reference numeral 612. This connectivity failure can be determined from the map data such as when the map data indicates that connectivity has been lost at all, or some relevant portion, of the physical ports, which can be determined on a per-session basis. In some embodiments, connectivity failure identified at 612 in conjunction with a failure of communication path 202 (e.g., determined by failure component 502) can be indicative of a dual SAN failure, which can be identified and included in status data 508

Example Methods

Figure 7:
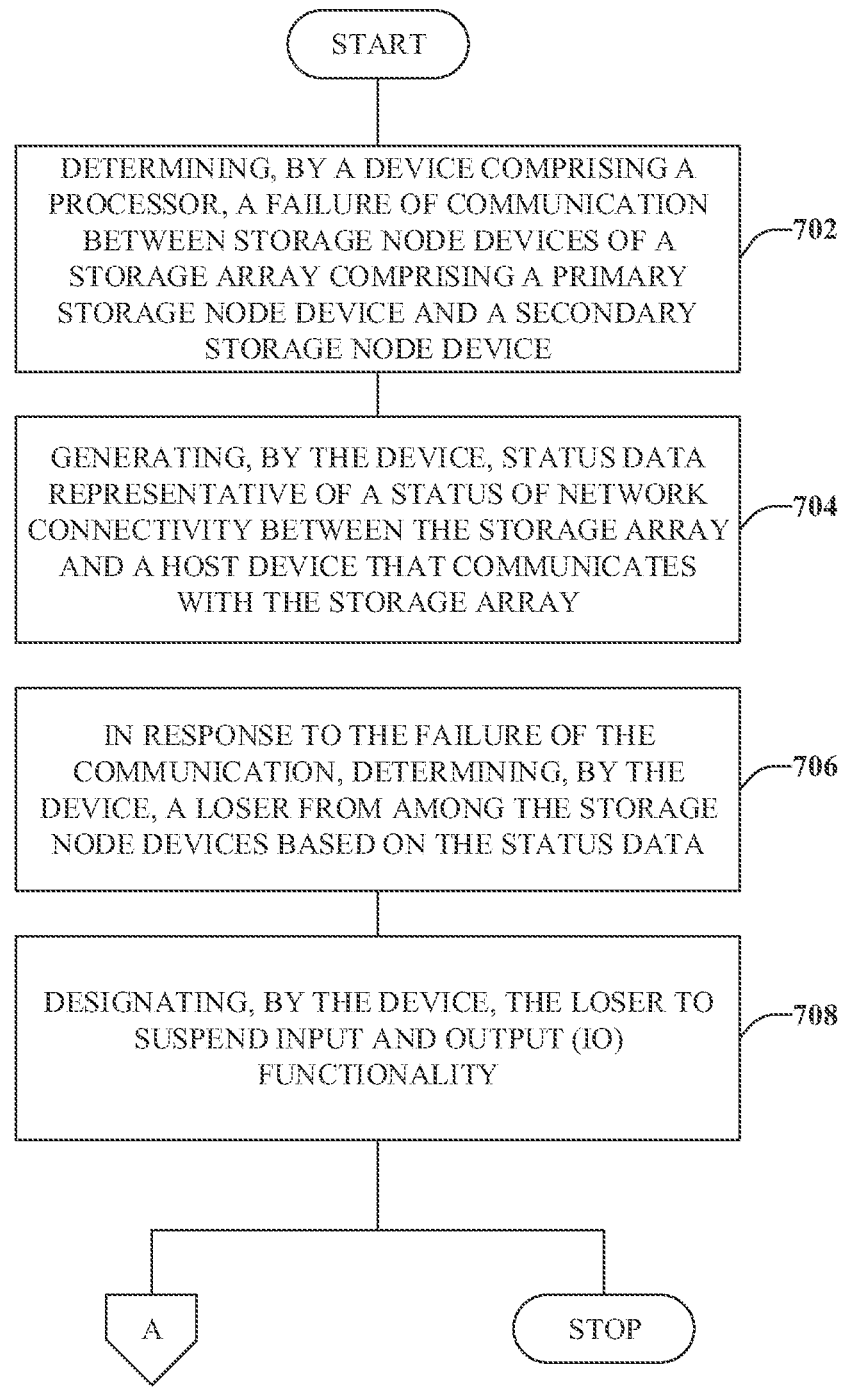
FIG. 7 illustrates an example methodology that can determine a loser or a winner as a function of network connectivity between the host and the array in accordance with certain embodiments of this disclosure.
Figure 8:
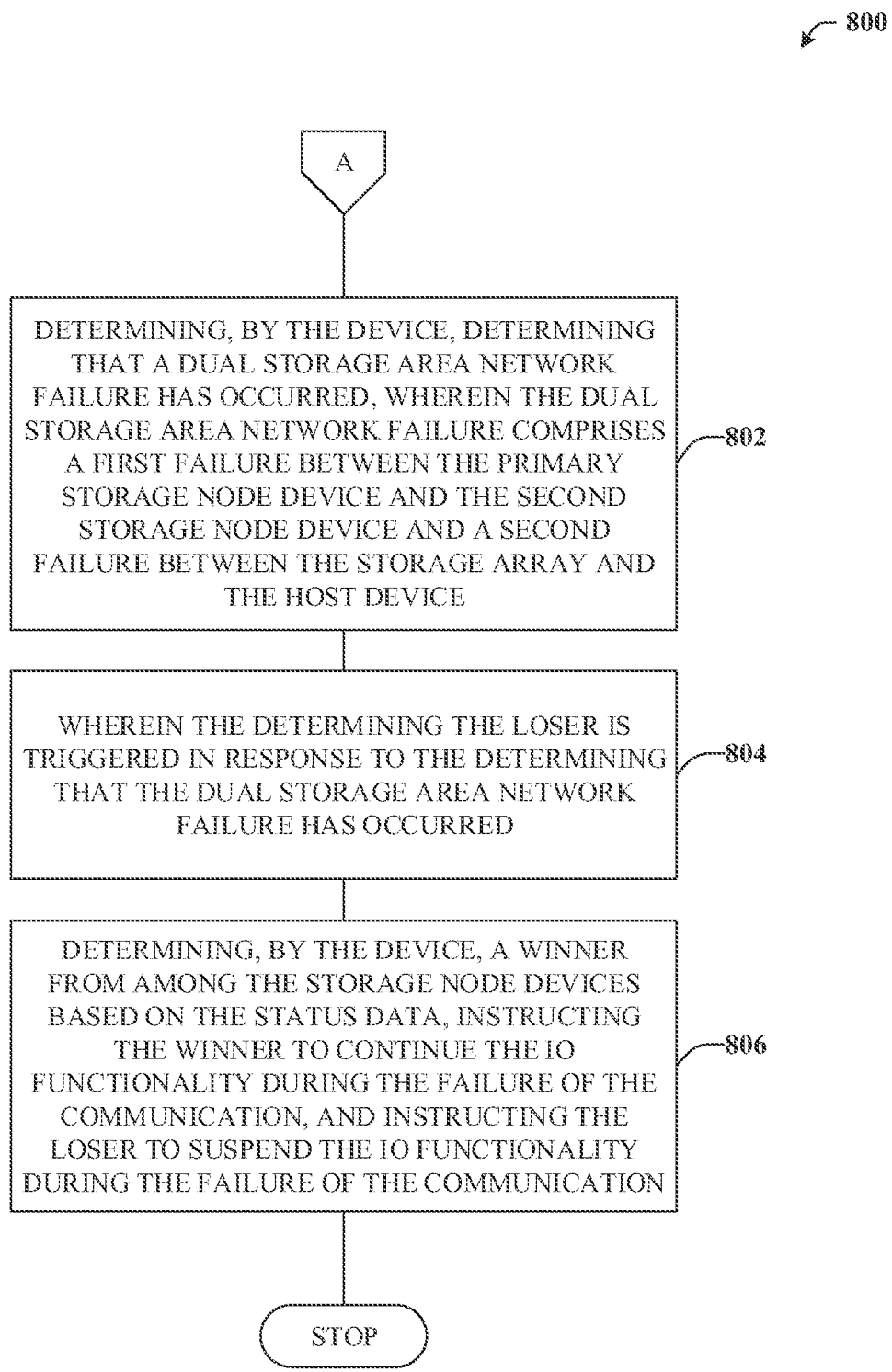
FIG. 8 illustrates an example methodology that can provide for additional aspect or elements in connection with determining a loser or winner in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Referring now to FIG. 7, exemplary method 700 is depicted. Method 700 can determine a loser or winner as a function of network connectivity between the host and the array in accordance with certain embodiments of this disclosure. While method 700 describes a complete methodology, in some embodiments, method 700 can include one or more elements of method 800, as illustrated by insert A.

At reference numeral 702, a device comprising a processor can determine a failure of communication between storage node devices of a storage array. For example, the storage array can comprise a primary storage node device and a secondary storage node device and the failure can represent a failure of communication between the primary storage node device and a secondary storage node device. As noted, this failure can result in a potential split-brain situation that can compromise data coherency.

At reference numeral 704, the device can generate status data. This status data can be representative of a status of network connectivity between the storage array and a host device that communicates with the storage array.

At reference numeral 706, in response to the failure of the communication, the device can determine a loser from among the storage node devices based on the status data. For example, the loser can be identified as the storage node having the lowest connectivity value of rating, as indicated by the status data. At reference numeral 708, the device can designate the loser to suspend IO functionality. In some embodiments, the loser can be instructed, based on the designation as a loser, to suspend IO functionality. As depicted, method 700 can stop or proceed to insert A, which is further detailed in connection with FIG. 8, or stop.

Turning now to FIG. 8, exemplary method 800 is depicted. Method 800 can provide for additional aspect or elements in connection with determining a loser or winner in accordance with certain embodiments of this disclosure.

At reference numeral 802, the device introduced at reference numeral 702 comprising a processor can determine that a dual SAN failure has occurred. In some embodiments, the dual SAN failure can comprise a first failure between the primary storage node device and the second storage node device and a second failure between the storage array and the host device.

At reference numeral 804, the device can determine the loser (e.g., determined at reference numeral 706 of FIG. 7) can be triggered in response to the determining that the dual SAN failure has occurred (e.g., determined at reference numeral 802). In other words, unless a dual SAN failure, or another suitable event, has occurred, a winner or loser can be determined by other criteria, such as based on environmental criteria. However, when the dual SAN failure, or another suitable event, is detected, then determining a winner or loser can be determined based on the connectivity data, as explained herein.

At reference numeral 806, alternatively, or in addition to determining the loser (e.g., determined at reference numeral 706 of FIG. 7), the device can determine a winner from among the storage node devices. The winner can be determined based on the status data (e.g., no or few connectivity issues). In some embodiments, the winner can be instructed to continue IO functionality during the failure of the communication and the loser can be instructed to suspend IO functionality during the failure of the communication.

Example Operating Environments

Figure 9:
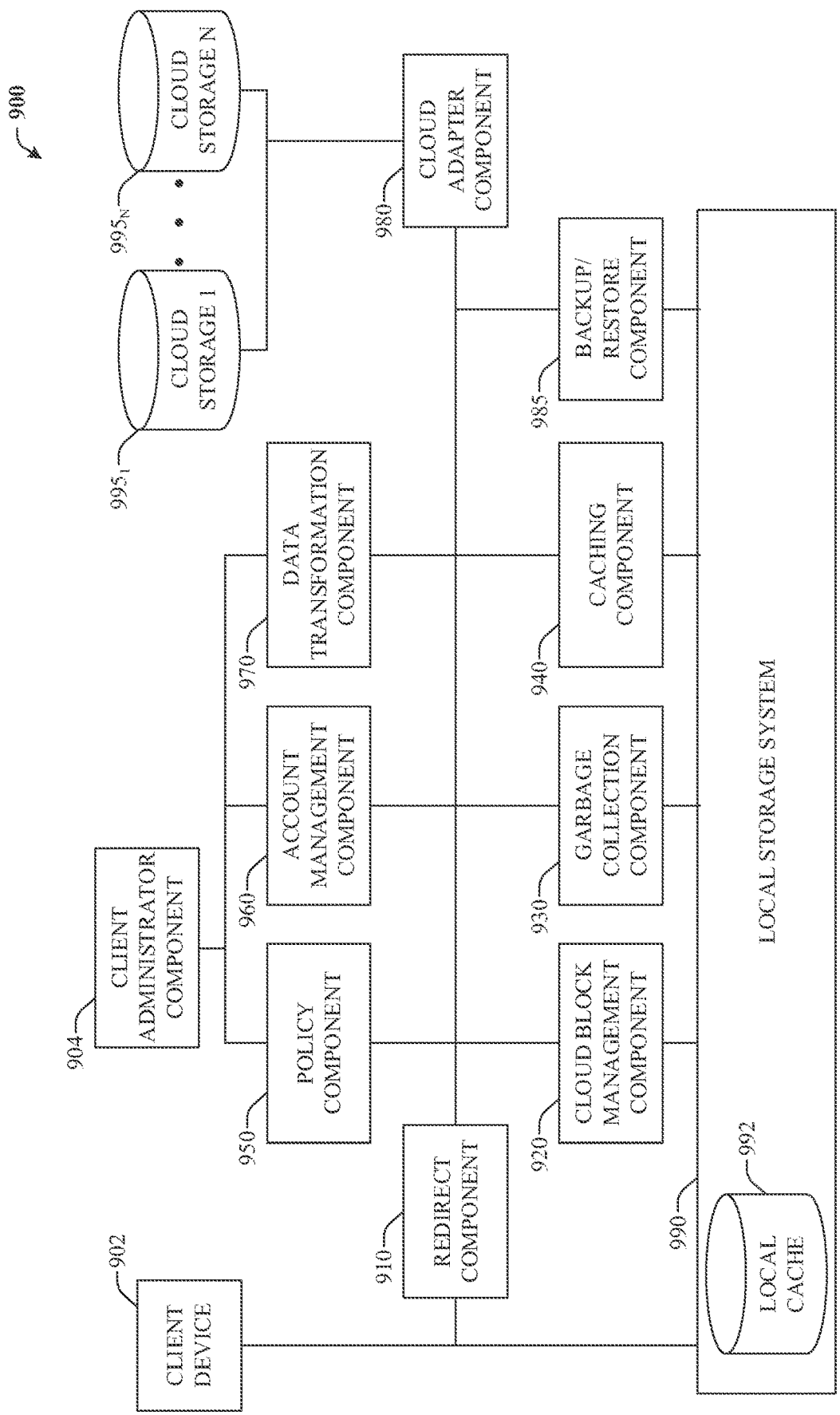
FIG. 9 illustrates a block diagram of an example distributed file storage system that employs tiered cloud storage in accordance with certain embodiments of this disclosure.
Figure 10:
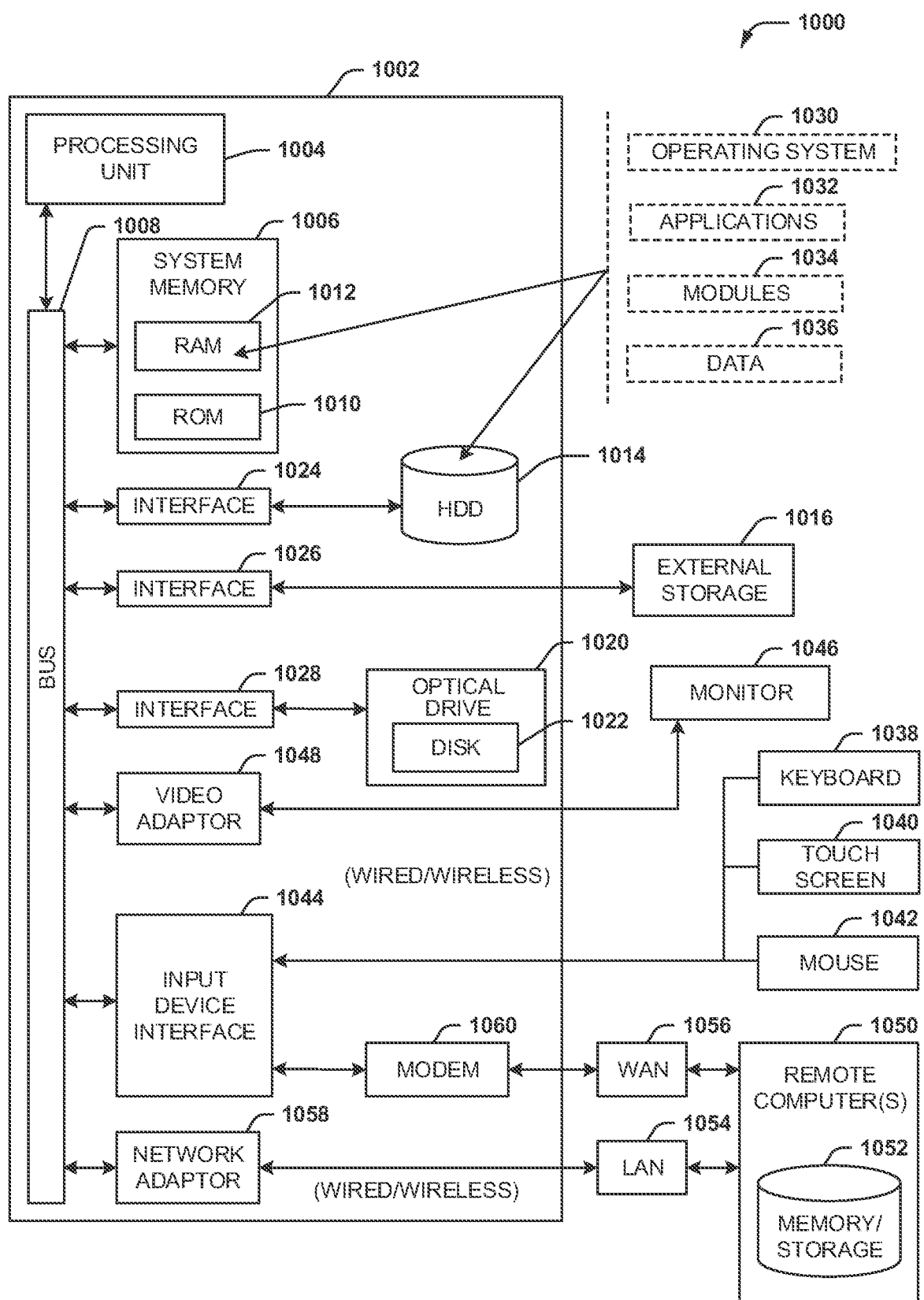
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory that stores computer executable components; and
   a processor that executes computer executable components stored in the memory, wherein the computer executable components comprise:
      a failure component that determines a failure of communication between storage nodes of a storage array comprising a primary storage node and a secondary storage node;
      a status component that generates status data representative of a status of network connectivity between the storage array and a host device that communicates with the storage array; and
      a witness component that, in response to the failure of the communication:
         determines, as a function of the status data, a loser node from among the storage nodes and a winner node from among the storage nodes, wherein the loser node is determined in response to a dual storage area network failure comprising a first failure between the primary storage node and the secondary storage node and a second failure between the storage array and the host device;
         instructs the winner node to continue input and output (IO) functionality of the winner node during the failure of the communication; and
         designates the loser node to suspend IO functionality of the loser node during the failure of the communication.

2. The system of claim 1, wherein the primary storage node and the secondary storage node are configured according to an active-active session, in which the primary storage node and the secondary storage node are active and configured to:
   update data stored at the storage array in response to IO transactions with the host device; and
   synchronize updates between the primary storage node and the secondary storage node.

3. The system of claim 1, wherein the failure of the communication between the storage nodes is determined to lead to a split brain condition for the storage array in which coherency of data stored at the storage array becomes compromised.

4. The system of claim 1, wherein the status component generates the status data in response to monitoring a connectivity state of a network adapter device.

5. The system of claim 4, wherein the status component maintains map data indicative of a mapping of volumes of the storage array in an active-active session to physical ports of the network adapter device.

6. The system of claim 5, wherein the map data comprises first session data indicative of a first mapping of a first active-active session and second session data indicative of a second mapping of a second active-active session.

7. The system of claim 5, wherein the witness component determines the loser node in response to determining that connectivity has been lost at all of the physical ports.

8. The system of claim 1, wherein the witness component designates the loser node to suspend the IO functionality to mitigate a split brain condition from occurring due to the failure of the communication between the storage nodes.

9. The system of claim 1, wherein the witness component determines, as a function of the status data, the winner node from among the storage nodes and designates the winner node to continue the IO functionality to mitigate a split brain condition from occurring due to the failure of the communication between the storage nodes.

10. The system of claim 1, wherein the status component generates the status data in response to an examination of an optical link of a network adapter that serves a determined portion of the storage array.

11. The system of claim 1, wherein the loser node is a first loser node, and wherein the witness component determines a second loser node from among the storage nodes that is different from the first loser node and the winner node, and instructs the second loser node to suspend IO functionality of the second loser node during the failure of the communication between the storage nodes.

12. A non-transitory computer-readable medium comprising instructions that, in response to execution, cause a device comprising a processor to perform operations, comprising:
   determining a failure of communication between storage node devices of a storage array comprising a primary storage node device and a secondary storage node device;
   generating status data representative of a status of network connectivity between the storage array and a host device that communicates with the storage array;
   in response to the failure of the communication, determining, as a function of the status data, a winner from among the storage node devices;
   in response to the failure of the communication, determining, as a function of the status data, a loser from among the storage node devices, wherein the loser is determined in response to a dual storage area network failure comprising a first failure between the primary storage node and the secondary storage node and a second failure between the storage array and the host device;
   designating the winner to continue input and output functionality associated with the winner during the failure of the communication; and
   designating the loser to suspend input and output functionality associated with the loser during the failure of the communication.

13. The non-transitory computer-readable medium of claim 12, wherein the operations further comprise maintaining map data indicative of a mapping of volumes of the storage array to physical ports of a network adapter device.

14. The non-transitory computer-readable medium of claim 13, wherein the map data comprises first session data indicative of a first mapping of a first active-active session and second session data indicative of a second mapping of a second active-active session.

15. The non-transitory computer-readable medium of claim 13, wherein the witness component determines the loser in response to determining that connectivity is lost at all of the physical ports.

16. A method, comprising:
   determining, by a device comprising a processor, a failure of communication between storage node devices of a storage array comprising a primary storage node device and a secondary storage node device;
   generating, by the device, status data representative of a status of network connectivity between the storage array and a host device that communicates with the storage array;
   in response to the failure of the communication, determining, by the device, a loser from among the storage node devices based on the status data;

designating, by the device, the loser to suspend input and output (IO) functionality during the failure of the communication, wherein the loser is determined in response to a dual storage area network failure comprising a first failure between the primary storage node and the secondary storage node and a second failure between the storage array and the host device; and determining, by the device, a winner from among the storage node devices based on the status data and instructing the winner to continue the IO functionality during the failure of the communication.

17. The method of claim 16, wherein the determining the loser is triggered in response to the determining that the dual storage area network failure has occurred.

18. The method of claim 16, wherein the generating the status data is in response to an examination of an optical link of a network adapter that provides communication service to a defined portion of the storage array.

19. The method of claim 16, wherein the storage node devices comprises the primary storage node device, the secondary storage node device, and a tertiary storage node device, and further comprising determining, by the device, the winner and two losers from among the storage node devices.

20. The method of claim 19, further comprising instructing, by the device, the two losers to suspend IO functionality during the failure of communication.

\* \* \* \* \*